United States Patent [19]

Lopez et al.

[11] Patent Number: 4,967,301
[45] Date of Patent: Oct. 30, 1990

[54] SHALLOW MAGNETIC HEAD SHIELD FOR REDUCING FEEDTHROUGH

[75] Inventors: Rudolph M. Lopez; James L. Nix; Robert E. Weinstein, all of Tucson, Ariz.

[73] Assignee: International Business Machines Corporation, Armonk, N.Y.

[21] Appl. No.: 520,170

[22] Filed: May 9, 1990

Related U.S. Application Data

[63] Continuation of Ser. No. 234,771, Aug. 22, 1988, abandoned.

[51] Int. Cl.⁵ .............................................. G11B 5/11
[52] U.S. Cl. ..................................................... 360/128
[58] Field of Search ............................... 360/128, 121

[56] References Cited

U.S. PATENT DOCUMENTS

| | | | |
|---|---|---|---|
| 3,042,753 | 7/1962 | Iwamura | 179/100.2 |
| 3,700,828 | 10/1972 | Zacaroli | 360/128 |
| 3,744,040 | 7/1973 | Honegger et al. | 340/174.1 |
| 3,806,902 | 4/1974 | Drees et al. | 360/129 |
| 3,895,002 | 7/1975 | Ridgway et al. | 360/128 |
| 4,622,616 | 11/1986 | Isshiki | 360/128 |

OTHER PUBLICATIONS

"Low Noise Magnetic Recording Head", IBM Technical Disclosure Bulletin, vol. 8, No. 4, Sep. 1965, pp. 499–500.

Jorgensen, Finn, "The Complete Handbook of Magnetic Recording", Jul. 1980, pp. 152–154.

Primary Examiner—Robert S. Tupper
Attorney, Agent, or Firm—Manny W. Schecter

[57] ABSTRACT

A magnetic head is disclosed in which thin strips of shielding are inlaid into the surface of the magnetic head between the read and write gaps for reducing feedthrough. The shielding extends across a substantial portion of the tape-engaging surface between the read and write gaps. Further reduction of feedthrough is achieved by inlaying additional shielding outboard of the read gaps. The shielding does not encircle individual read or write gaps, but may extend across tracks in a multitrack head. The shielding is made of a magnetically permeable material which absorbs magnetic flux which otherwise strays from the magnetic cores. Material and manufacturing costs are maintained low because the shields are small and simple in geometry.

11 Claims, 2 Drawing Sheets

SHALLOW MAGNETIC HEAD SHIELD FOR REDUCING FEEDTHROUGH

This application is a continuation of application Ser. No. 07/234,771, filed Aug. 22, 1988, now abandoned.

BACKGROUND OF THE INVENTION

1. Field of the Invention

This invention relates to magnetic heads. More particularly, the invention is a structure for a read-after-write magnetic head having improved means for reducing flux leakage between circuits.

2. Description of the Related Art

The principle of placing information upon a moving magnetizable surface, and subsequently deriving the information therefrom, has been utilized for many years in various types of apparatus. Perhaps the most common use is the computer, which makes use of magnetizable storage media such as magnetic tape for storing and recording information in digital form. Information is stored on small areas of the tape surface, known as magnetic domains. The magnetic domains are microscopic in size and can be oriented to form a magnetized area of one of two polarities, representing digital zeros or ones. The magnetic domains are oriented by placing the tape in a magnetic field. The tape is a plastic ribbon coated with a "hard" magnetic material, i.e. one which retains its magnetization after it has passed through a magnetic field. Later, the information on the tape can be sensed magnetically. By appropriately combining the digital signals in a known manner, large amounts of information can be stored on the magnetic tape. The information may be recorded in any one of several binary data codes.

Read-after-write magnetic heads are used for the writing and reading of information in computer peripherals such as magnetic tape drives. These heads may have one or more tracks, with each track having closely spaced, parallel read and write core gaps. Each core gap is formed by a pair of core pieces, hereinafter referred to together as a magnetic core, with a coil mounted on one core piece. A "gap" may extend beyond the core for manufacturing purposes, but only that portion formed by the core pieces is referred to as the "core gap". The core gap, magnetic core, and coil are hereinafter referred to as a magnetic flux circuit, a magnetic transducer, or simply a magnetic circuit. The input to the write coil is a digital electrical signal comprising a series of pulses. The excitation current from the signal produces magnetic field lines that diverge from the gap and penetrate magnetic tape moving past the write gap from a tape supply reel. In this manner, information in the form of digital zeros and ones is recorded on the magnetic tape. The magnetic heads have "soft" magnetic cores; magnetization is not retained therein after the excitation current is removed.

Immediately following recording, the magnetic tape passes over the read gap where the recorded information is sensed to check the accuracy of the recording. The read and write functions are carried on simultaneously by the magnetic head so that the accuracy of the written information can be verified without interruption of the writing process. As the magnetic tape continues past the write gap and passes over the read gap, magnetic field lines from the recorded tape permeate the core of the read gap and produce an induced voltage in the read coil. From this induced voltage, the information recorded on the tape can be reproduced.

Because of the extremely close proximity of the read and write magnetic flux circuits, and because of the relatively high current flow through the write coil, the write signal tends to be fed over and sensed by the read circuit. This coupling of the read and write circuits is known as crossfeed or feedthrough. If the feedthrough caused by leakage flux is too high, the signal induced in the read circuit by the leakage flux from the write circuit may be so large as to mask the signal sensed from the tape. Thus, feedthrough can prevent one from properly utilizing the magnetic tape by rendering the output of the read coil meaningless. This problem has heretofore been dealt with in a number of ways.

One method of reducing feedthrough includes the use of copper shield elements inlaid in the surface of the magnetic core of a magnetic head. "Low Noise Magnetic Recording Head", *IBM Technical Disclosure Bulletin*, Vol. 8, No. 4, Sept., 1965, pp. 499–500. The copper shield elements provide two benefits. First, feedthrough is reduced because the portions of the core pieces that are exposed are significantly reduced. Also, the magnetic field that is emitted across the gap of the head is increased because the fields generated within the head are forced out through the small exposed portions and gap of the magnetic core. However, the increased field emitted from the head to the tape can actually increase the risk of feedthrough along the path from a write gap to the tape and into a read gap. In addition, metallic inlays tend to create magnetic eddy currents which disrupt the magnetic performance of a head.

Other shielding schemes exist which use shields manufactured at least in part from soft permeable magnetic materials. U.S. Pat. No. 3,042,753 discloses a magnetic shield which is a casing almost completely encapsulating a discrete magnetic core. The shield is used to protect the core from stray magnetic fields. This scheme suffers in that each discrete magnetic core is individually encapsulated by a distinct shield. In modern magnetic devices in which magnetic heads are built with several gaps integrated into a single unit, it is impractical to separately shield each magnetic gap in such a manner.

U.S. Pat. No. 3,744,040 discloses a shield which is specifically used to prevent feedthrough. This shield is C-shaped such that it nearly surrounds the entire magnetic core. This shield suffers in that the encapsulating shape and the extreme depth of the shield with respect to that of the core means that the shield will be expensive to produce. The use of such a large shield requires much manufacturing time and materials. In addition, shields such as this which are relatively thin on the surface of the magnetic head, do not provide a effective feedthrough prevention mechanism for the feedthrough path extending from the write gap along the tape path and into the read gap. Finally, a merely deep shield may not adequately prevent feedthrough in heads having raised read and write gaps because an unshielded area may exist therebetween.

Another feedthrough shield is disclosed in U.S. Pat. No. 3,806,902. This patent discloses a set of shields which are interconnected to surround, or nearly surround, each magnetic core. However, while the shield pieces are shallow in certain areas, they tend to be quite deep in the region located between the read and write portions of the head. Thus, this shielding technique suffers from the same problems discussed with respect to U.S. Pat. 3,744,040.

A problem similar to feedthrough in magnetic heads is known as cross-talk. Cross-talk is the interference not between the read and write components of a magnetic head, but between two read components or two write components across different tracks of a head. Jorgensen discloses that cross-talk can be greatly reduced by the insertion of deep shields between the cores. Jorgensen, Finn, "The Complete Handbook of Magnetic Recording", July, 1980, pp. 152–154. It is further disclosed that full shields must be used because any split in the shields may create a secondary recording gap and will reduce the shielding efficiency. Thus, Jorgensen teaches that the shields used to reduce cross-talk must be both deep and unbroken. Heads manufactured accordingly would again suffer from the aforementioned problems.

SUMMARY OF THE INVENTION

In view of the foregoing, it is the principle object of this invention to improve shielding for the prevention of feedthrough in magnetic heads.

Another object of the invention is the aforementioned shielding which is easy to manufacture and requires small amounts of inexpensive materials.

These and other objects of the invention are accomplished by inlaying thin strips of ferrite into the surface of a magnetic head for reducing feedthrough. The strips of ferrite are shallow but extend across a substantial portion of the tape-engaging surface between the read and write gaps. Further reduction of feedthrough is achieved by inlaying additional strips of ferrite outboard of the read gaps. The strips do not encircle individual read/write gaps, but may extend across tracks in a multitrack head. Because the strips are made of ferrite, magnetic flux which would otherwise stray from the magnetic cores is absorbed. Since the ferrite strips are small and can be easily manufactured, they are a cost efficient means for reducing feedthrough.

The foregoing and other objects, features and advantages of the invention will be apparent from the following more particular description of the preferred embodiment of the invention, as illustrated in the accompanying drawing.

DETAILED DESCRIPTION OF THE PREFERRED EMBODIMENT

Figure 1:
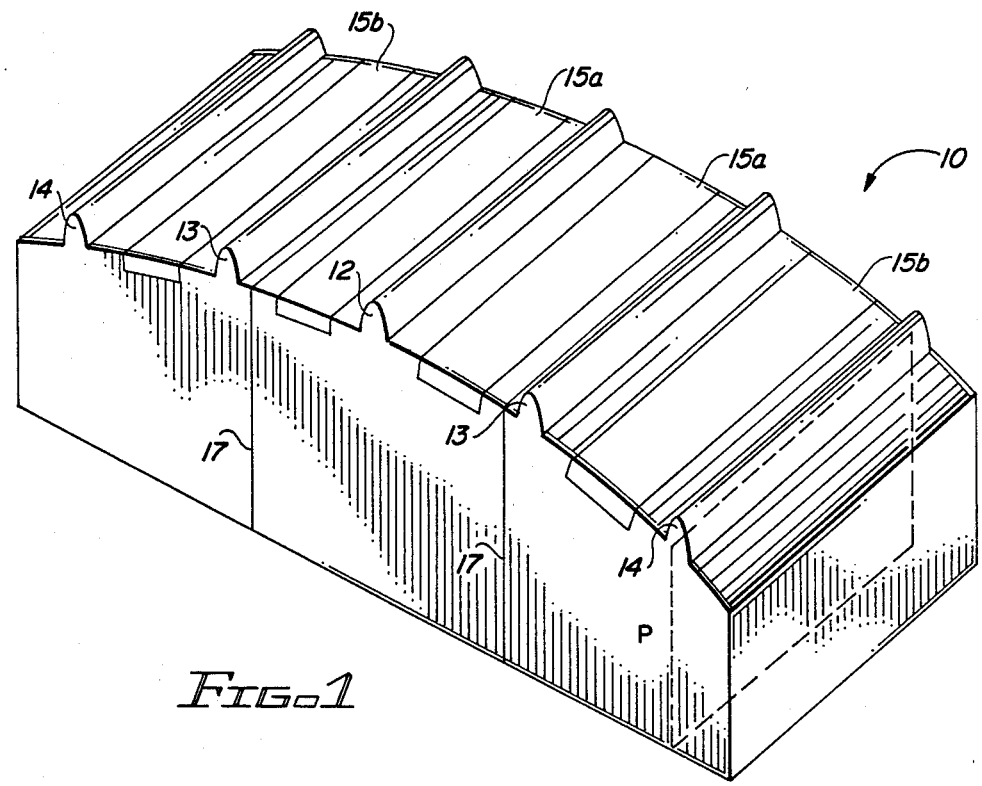
FIG. 1 is a perspective view of a read-after-write magnetic head according to the invention.
Figure 2:
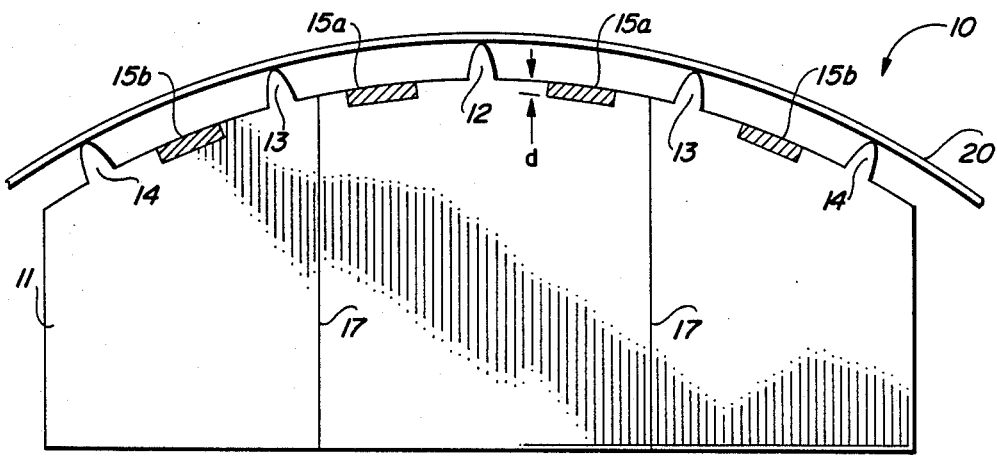
FIG. 2 is a side view of the read-after-write magnetic head of FIG. 1.
Figure 3:
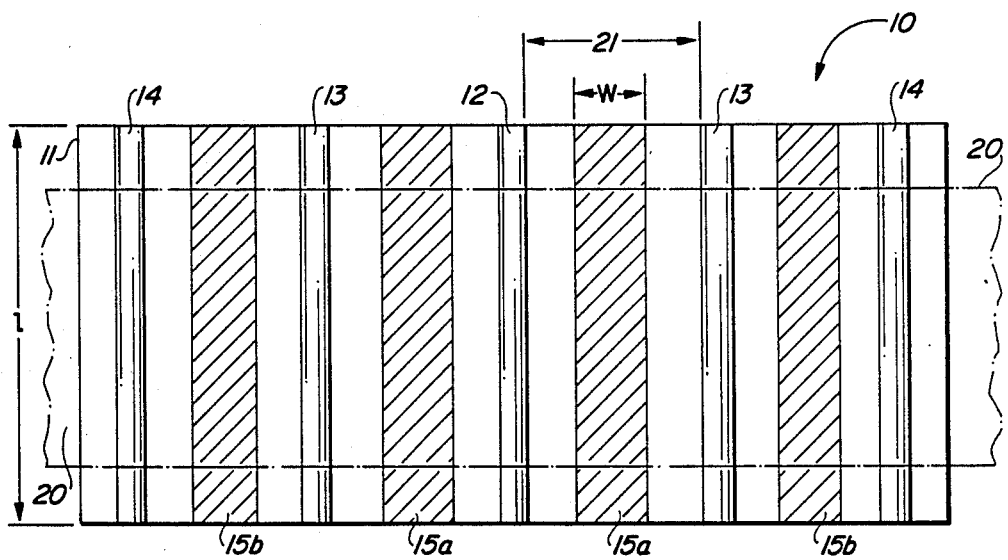
FIG. 3 is a top view of the tape-engaging surface of the read-after-write magnetic head shown in FIG. 1.

Referring to FIGS. 1–3, a read-after-write magnetic head according to the invention will now be described. A magnetic head 10 includes a metal casing 11, a write gap 12, and read gaps 13. Gaps 12 and 13 are for reading information from or writing information to a magnetic tape 20. The gaps 12 and 13 are part of read or write magnetic circuits, as the case may be, including magnetic cores with coils wound thereon. The magnetic cores and coils are not shown in the drawing for simplicity and are known to one of skill in the art. Mechanical bumps 14 have no magnetic components, merely serving to support magnetic tape 20, and are not of significance to the present invention.

In operation, magnetic tape 20 traverses across the generally arcuate tape-engaging surface of magnetic head 10. Magnetic tape 20 moves longitudinally, and may do so in an approximate left-to-right or right-to-left motion as viewed in the drawing. Because there is a read gap 13 on either side of write gap 12, magnetic tape 20 may be read immediately after writing regardless of the direction of magnetic tape travel. For example, if magnetic tape 20 travels in a left-to-right direction as shown in the drawing, data could be written to the tape at write gap 12 and read from the tape at rightmost gap 13. If the direction of tape travel is reversed, read-after-write is accomplished using the leftmost read gap 13. Because the present invention concerns feedthrough from a write gap to a read gap, there is no significance to the presence of dual read gaps to form a read-after-write head. Feedthrough prevention according to the present invention applies to any magnetic head including both a read gap and a write gap.

As previously mentioned, feedthrough in read-after-write magnetic heads can be caused by the write signal being fed over and sensed by the magnetic read circuit. In magnetic head 10 feedthrough is prevented by a plurality of shields 15a and 15b inlaid into the surface thereof. Shields 15a and 15b are composed of a high resistivity, soft magnetic material, such as ferrite, to absorb any leakage flux. The shields may be placed both inboard and outboard of read gaps 13. An inboard shield 15a is one located between write gap 12 and one of read gaps 13. An outboard shield 15b is one located between one of read gaps 13 and one of mechanical bumps 14. Both inboard and outboard shields 15a and 15b serve to absorb the leakage flux from one of the write gaps 12.

Shields 15a and 15b are quite shallow in depth. Depth refers to the dimension extending inward into magnetic head 10 from its tape-engaging surface. Thus, the depth d of the shields can be seen in FIG. 2 of the drawing. Although the mggnetic cores associated with gaps 12 and 13 are not shown in the drawing, the depth d of the shields should not exceed twice that of the depth of the nearest associated read and write gaps to each shield. Deeper shields may not necessarily degrade shielding performance but will result in increased material and manufacturing costs, as will be described later herein. Conventional feedthrough shields 17 may be used in conjunction with shields 15a and 15b. Shields 17 are of significantly greater depth than shields 15a and 15b, typically extending through the complete depth of the magnetic head. Shields 17 are not adequate for the prevention of the feedthrough mechanism previously described, and their modification would add significantly to the material and manufacturing costs of magnetic head 10. Shields 15a, 15b and 17 may or may not be in contact but must be separately constructed components. (Shields 17 are not shown in FIG. 3 of the drawing for simplicity.)

The length l of shields 15a and 15b is also significant. The length l of shields 15a and 15b need not extend the entire width of magnetic head 10. Shields 15a and 15b must simply extend parallel to and between the active areas of gaps 12 and 13 or gaps 13 and bumps 14. To ensure that the feedthrough paths are adequately isolated, shields 15a and 15b should be at least 80 percent in length of that of the adjacent gaps 12 and 13. Shields 15a and 15b, however, may be longer than gaps 12 and 13 or mechanical bumps 14 if such are less than the width of magnetic head 10. In any case, shields 15a and 15b exist between bumps 14 and gaps 13, or gaps 13 and gaps 12, along the direction of movement of tape 20 on the tape-engaging surface of magnetic head 10. Shields 15a and 15b are thus said to be "coextensive" with their nearest respective bumps 14 or gaps 12 and 13. That is, shields 15a and 15b do not break the plane formed by the dimensions of bumps 14 or gaps 12 and 13 in the dimensional directions of depth d and length l, such as shown by plane p in FIG. 1.

The width w of shields 15a and 15b must be great enough such that enough area of the tape-engaging surface is covered to adequately absorb leakage flux from write gap 12. Shields 15a and 15b are of width w at least five percent of the distance 21 between the nearest respective gaps 12 and 13, or gap 13 and bump 14, along said tape-engaging surface. Shields 15 may be as close to the magnetic circuits including gaps 12 or 13 as possible provided they are not actually in contact therewith because such would interfere with magnetic performance. This non-contact requirement applies not only along the tape-engaging surface, but at any depth of magnetic head 10. A final way of expressing the dimensional requirements for shields 15a is that inboard shields 15a cover at least five percent of the tape-engaging surface between read gaps 13 and write gap 12, while still meeting the other criteria.

Figure 4:
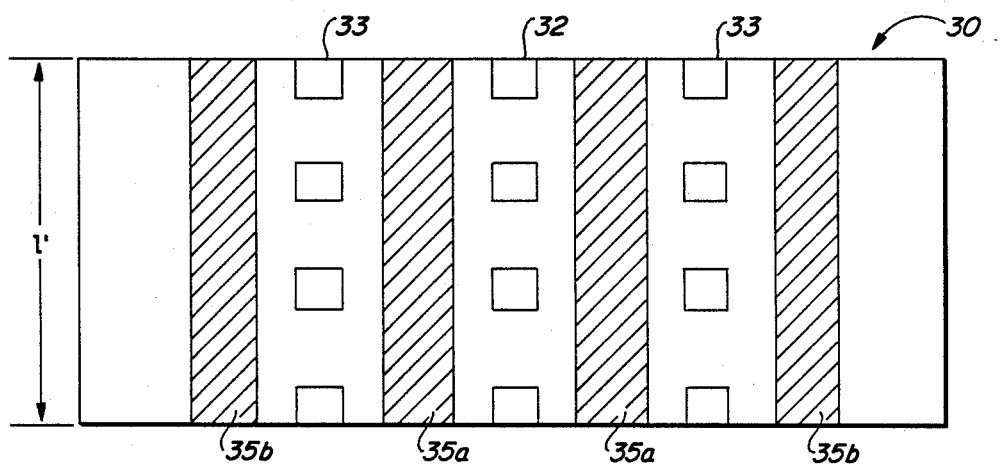
FIG. 4 is a top view of a multitrack read-after-write magnetic head according to the invention.

Referring to FIG. 4, a multitrack magnetic head 30 will now be described. Magnetic head 30 differs from magnetic head 10 in that several tracks of associated read and write core gaps are built into the gaps of the head. The use of multiple tracks permits the recording of data along parallel channels in the longitudinal direction of the magnetic tape, thereby increasing the recording density of information on the magnetic tape. Each track is represented in the drawing by a horizontal row of core gaps 32 and 33. A vertical column of core gaps 32 or 33 may actually be a single gap in which the core gaps are manufactured only at the boxes shown in FIG. 4. The tracks may be isolated using further shielding techniques not shown in the drawing to prevent cross-talk between tracks. Shields 35a and 35b exist not only between core gaps of a particular track but extend in length l across some or all tracks. Shields 35a and 35b are thus coextensive with an entire column of core gaps 32 or 33 and mechanical bumps as shown in the drawing. In no case do shields 35a and 35b in any way encircle core gaps 32 or 33 or break the aforementioned planes formed thereby. (Similarly, shields 15a and 15b do not encircle gaps 12 or 13.) As will be discussed later, this feature permits easier manufacture and reduces magnetic head costs.

The dimensions of a magnetic head manufactured according to the best mode of the invention will now be described. The head is a four track head of total width of approximately 0.840 inches. The spacing between core gaps of different tracks is approximately 0.102 inches and the spacing between read gaps and write gaps along the tape-engaging surface is approximately 0.300 inches. The inboard shields are inlaid into the tape-engaging surface to a depth of approximately 0.020 inches. The inboard shields are of length approximately 0.800 inches and width approximately 0.060 inches, and exist within approximately 0.120 inches of the write gap. The outboard shields are inlaid into the tape-engaging surface to a depth of approximately 0.005 inches. The outboard shields are of length approximately 0.800 inches and width approximately 0.020 inches, and exist within approximately 0.055 inches of the respective read gap.

Magnetic heads structured according to the invention may be manufactured in a variety of ways, provided the need for shielding to prevent feedthrough exists. Several methods of manufacturing magnetic heads in which the present invention could be incorporated are well known to one of skill in the art. For example, the magnetic head of this invention can be manufactured using known metallic lamina techniques. The use of a laminated structure reduces magnetic eddy currents in the magnetic circuits. The lamina include both magnetic and non-magnetic materials. The magnetic materials may be for example alloys of iron and nickel and perhaps a variety of other elements as are known in the art. The non-magnetic materials include a number of metals such as copper, silver, bronze, etc. In the aforementioned example, the dimensions given for a magnetic head according to the invention are for a laminated head using nickel-iron and brass as the material components. Thin strips of the materials are shaped and laminated together to form each core piece of the magnetic head. The core pieces are contoured, assembled, and contoured again to create a tape path of the required magnetic properties. A more complete description of how to make and assemble such laminated structures is disclosed in U.S. Pat. No. 3,614,830, hereby incorporated by reference.

It is after assembly and final contouring of the magnetic head that the shields of the invention are created. Referring again to FIGS. 1 and 3 of the drawing, a groove or slot is cut in the tape-engaging surface of magnetic head 10 for each shield 15a or 15b using common milling or sawing machine techniques. Ferrite shields which have been cut and milled into strips to fit the grooves or slots in the magnetic head are then placed therein. Adhesives, such as epoxies, may then be used to permanently bond ferrite shields 15a and 15b into the grooves. By maintaining simple geometries for shields 15a and 15b (i.e. the shields are merely coextensive with their nearest respective gaps or mechanical bumps rather than encapsulating their nearest respective gaps) the cost of producing the magnetic heads is significantly reduced. No complicated geometries of the shields must be prepared. In addition, because the shields are small in that they do not encapsulate gaps 12 and 13 and are quite shallow, material costs are further kept low. Finally, deep feedthrough or cross-talk shields used in conjunction with the inlaid shallow shields are of simple flat geometry also, thereby minimizing manufacturing costs and simplifying manufacturing techniques.

While the invention has been described with respect to a preferred embodiment thereof, it will be understood by those skilled in the art that various changes in detail may be made therein without departing from the spirit, scope and teaching of the invention. For example, it is not necessary that the read gaps and write gaps be exactly parallel to one another or that the shallow shields of the invention be exactly parallel thereto. Although these components of the magnetic head will exist along a path across the width of the head, they only need be parallel to the extent that the head be able to maintain its magnetic operational characteristics. As a further example, a shallow shield could extend across the length and width of a head not with a straight-line edge but with a slight contour, such as a sawtooth or zig-zag edge. The presence of the sawtooth or zig-zag edge would prevent the shield from being exactly parallel to the read and write gaps or mechanical bumps of the magnetic head. However, since the shields would still exist across the width of the magnetic head and tape-engaging surface in the plane of the tape-engaging surface, the shields would still be considered "parallel" according to the invention. Finally, the invention has been described in the context of magnetic tape, but the data recording media could be any magnetic media. Accordingly, the invention herein disclosed is to be limited only as specified in the following claims.

What is claimed is:

1. A magnetic head having a magnetic media-engaging surface comprising:
    a write magnetic circuit including a write core having a write gap at said media-engaging surface;
    a read magnetic circuit including a read core having a read gap at said media-engaging surface, said read gap parallel to said write gap; and
    a soft magnetic shield between said write gap and said read gap at said tape-engaging surface, said shield of a length at least 80 percent of that of the longer of said write gap and said read gap at the media-engaging surface in the direction perpendicular to that of the tape movement, said shield of a depth no more than twice that of the deeper of said write gap and said read gap.

2. The magnetic head of claim 2 wherein said shield covers at least five percent of the media-engaging surface between said write gap and said read gap.

3. The magnetic head of claim 1 wherein said shield is of a width at least five percent of the distance between said write core and said read core at said media-engaging surface.

4. The magnetic head of claim 1 further comprising another ferrite shield at said media-engaging surface, said another shield outboard of and coextensive with said write gap.

5. The magnetic head of claim 1 further comprising another ferrite shield at said media-engaging surface, said another shield outboard of and coextensive with said read gap.

6. A magnetic head having a magnetic media-engaging surface comprising:
    a write magnetic circuit including a write core having a write gap at said media-engaging surface;
    two read magnetic circuits each including a read core having a read gap at said media-engaging surface, said read gaps parallel to said write gap, said read gaps on opposite sides of said write gap at said media-engaging surface; and
    two soft magnetic shields between said read gaps at said media-engaging surface, said shields on opposite sides of said write gap at said media-engaging surface, said shields of a length of at least 80 percent of that of the longer of said write gap and the nearest respective read gap at the media-engaging surface in the direction perpendicular to that of the tape movement, said shield of a depth no more than twice that of the deeper of said write gap and said read gap.

7. The magnetic head of claim 6 wherein said shields cover at least five percent of the media-engaging surface between said write gap and the nearest respective read gap.

8. The magnetic head of claim 6 wherein said shields are of a width at least five percent of the distance between said write core and the nearest respective read core at said media-engaging surface.

9. The magnetic head of claim 6 further comprising another ferrite shield at said media-engaging surface, said another shield outboard of and coextensive with one of said read gaps.

10. A multitrack magnetic head having a magnetic media-engaging surface comprising:
    a write magnetic circuit for each track including a write core having a write gap at said media-engaging surface;
    two read magnetic circuits for each track, each read magnetic circuit including a read core having a read gap at said media-engaging surface, said read gaps parallel to the write gap of the respective track, said read gaps on opposite sides of the write gap of the respective track at said media-engaging surface; and
    two soft magnetic shields between said read gaps of the same track at said media-engaging surface, said shields on opposite sides of said write gap at said media-engaging surface, said shields of a length of at least 80 percent of that of the longer of said write gap and the nearest respective read gap at the media-engaging surface in the direction perpendicular to that of the tape movement, said shields of a depth no more than twice that of the deeper of said write gap and said read gap.

11. A magnetic tape drive comprising:
    a magnetic tape;
    a magnetic head having a magnetic tape-engaging surface including:
        a write magnetic circuit including a write core having a write gap at said tape-engaging surface;
        two read magnetic circuits each including a read core having a read gap at said tape-engaging surface, said read gaps parallel to said write gap, said read gaps on opposite sides of said write gap at said tape-engaging surface; and
        two soft magnetic shields between said read gaps at said tape-engaging surface, said shields on opposite sides of said write gap at said tape-engaging surface, said shields of a length of at least 80 percent of that of the longer of said write gap and the nearest respective read gap at the tape-engaging surface in the direction perpendicular to that of the tape movement, said shields of a depth no more than twice that of the deeper of said write gap and said read gap;
    means connected to said magnetic tap for holding said magnetic tape in close proximity to said type-engaging surface of said magnetic head; and
    means connected to said magnetic tape for advancing said magnetic tape along said tape-engaging surface of said magnetic head.

* * * * *

UNITED STATES PATENT AND TRADEMARK OFFICE
CERTIFICATE OF CORRECTION

PATENT NO. : 4,967,301
DATED : October 30, 1990
INVENTOR(S) : Rudolph M. Lopez; James L. Nix; Robert E. Weinstein It is certified that error appears in the above—identified patent and that said Letters Patent is hereby corrected as shown below:

Column 8, Line 56, "tap" should read --tape--.

Column 8, Line 57, "type-" should read --tape- --.

Signed and Sealed this

Twenty-first Day of April, 1992

Attest:

HARRY F. MANBECK, JR.

*Attesting Officer*    *Commissioner of Patents and Trademarks*